(12) United States Patent
Wu et al.

(10) Patent No.: US 7,480,132 B2
(45) Date of Patent: Jan. 20, 2009

(54) PORTABLE COMPUTER HAVING IMPROVED LATCH MECHANISM

(75) Inventors: Chao-Chu Wu, Tu-Cheng (TW); Xiao-Gang Jiang, Shenzhen (CN); Xin-Hu Gong, Shenzhen (CN)

(73) Assignees: Hong Fu Jin Precision Industry (Shenzhen) Co., Ltd., Bao-an District, Shenzhen, Guangdong Province (CN); Hon Hai Precision Industry Co., Ltd., Tu-Cheng, Taipei Hsien (TW)

( * ) Notice: Subject to any disclaimer, the term of this patent is extended or adjusted under 35 U.S.C. 154(b) by 503 days.

(21) Appl. No.: 11/292,127

(22) Filed: Dec. 1, 2005

(65) Prior Publication Data

US 2006/0133025 A1 Jun. 22, 2006

(30) Foreign Application Priority Data

Dec. 4, 2004 (CN) .................. 2004 2 0102418 U

(51) Int. Cl.
*G06F 1/16* (2006.01)
(52) U.S. Cl. .................. 361/683; 292/87; 292/128; 292/202; 292/228
(58) Field of Classification Search .................. 361/683
See application file for complete search history.

(56) References Cited

U.S. PATENT DOCUMENTS 6,076,869 A 6/2000 Chen et al.
6,256,194 B1* 7/2001 Choi et al. .................. 361/683
6,517,129 B1* 2/2003 Chien et al. ............... 292/251.5
6,563,699 B1* 5/2003 Choi .......................... 361/683
6,707,665 B2* 3/2004 Hsu et al. .................... 361/681
7,261,331 B2* 8/2007 Lin ............................. 292/116
7,261,573 B2* 8/2007 Lin et al. ..................... 439/135
2003/0223190 A1* 12/2003 Hashimoto .................. 361/683
2005/0152120 A1* 7/2005 Lee ............................. 361/725
2005/0168923 A1* 8/2005 Huang et al. ................ 361/683
2005/0276010 A1* 12/2005 Song .......................... 361/683
2006/0103495 A1* 5/2006 Chen et al. .................. 335/205
2006/0109637 A1* 5/2006 Jiang et al. .................. 361/801
2006/0125585 A1* 6/2006 Lo et al. ...................... 335/285

FOREIGN PATENT DOCUMENTS

CN 01208955.9 3/2002

* cited by examiner

*Primary Examiner*—Lisa Lea-Edmonds
(74) *Attorney, Agent, or Firm*—Morris Manning Martin LLP; Tim Tingkang Xia, Esq.

(57) ABSTRACT

A portable computer includes a cover (1) unit and a base unit (2) connected with the cover unit. The cover unit includes a movable latch member (30), and a driving button (40). The latch member includes a pair of slanted slots (34) defined therein. The driving button includes a pair of driving posts (44) moving in the slanted slots. The cover unit is latched to the base unit via the latch member to cover the base unit and unlatched from the base unit via moving the latch member by manipulation of the driving button.

20 Claims, 5 Drawing Sheets

PORTABLE COMPUTER HAVING IMPROVED LATCH MECHANISM

CROSS-REFERENCE TO RELATED APPLICATION

Related subject matter is disclosed in a co-pending U.S. patent application having a Ser. No. 11/188,548, filed on Jul. 25, 2005 and entitled "PORTABLE COMPUTER HAVING IMPROVED LATCH MECHANISM", assigned to the same assignee with this application, and a co-pending U.S. patent application entitled "PORTABLE COMPUTER HAVING IMPROVED LATCH MECHANISM", also assigned to the same assignee with this application with an application Ser. No. 11/272,531, filed on Nov. 10, 2005.

BACKGROUND OF THE INVENTION

1. Field of the Invention

The present invention relates to a portable computer, and more particularly to a portable computer which includes a reliable latch mechanism.

2. General Background

Portable computers, such as laptop computers and notebook computers, have become increasingly popular for general use. Generally, a portable computer includes a cover unit, and a base unit pivotally connected with the cover unit. The cover unit is folded onto the base unit to cover the base unit when the portable computer is not in use. A latch mechanism is provided to lock the cover unit to the base unit.

As disclosed in China Patent No. 01208955.9, a portable computer includes a latch mechanism which acts to lock a cover unit to a base unit when the portable computer is not in use. The latch mechanism includes a hook for engaging the base unit, and a post movably embedded in the base unit for disengaging the hook from the base unit. An end portion of the post is exposed outside the base unit for facilitating pushing the post to disengage the hook from the base unit. However, the end portion of the post is liable to be accidentally touched resulting in undesired opening of the cover unit.

What is desired, therefore, is a portable computer which has an improved reliable latch mechanism.

SUMMARY

In one preferred embodiment, a portable computer includes a cover unit and a base unit connected with the cover unit. The cover unit includes a movable latch member, and a driving button. The latch member includes a pair of slanted slots. The driving button includes a pair of driving posts moving in the slanted slots. The cover unit is latched to the base unit via the latch member to cover the base unit and unlatched from the base unit via moving the latch member by manipulation of the driving button.

Other advantages and novel features will become more apparent from the following detailed description of preferred embodiments when taken in conjunction with the accompanying drawings, in which:

DETAILED DESCRIPTION OF THE EMBODIMENTS

Figure 1:
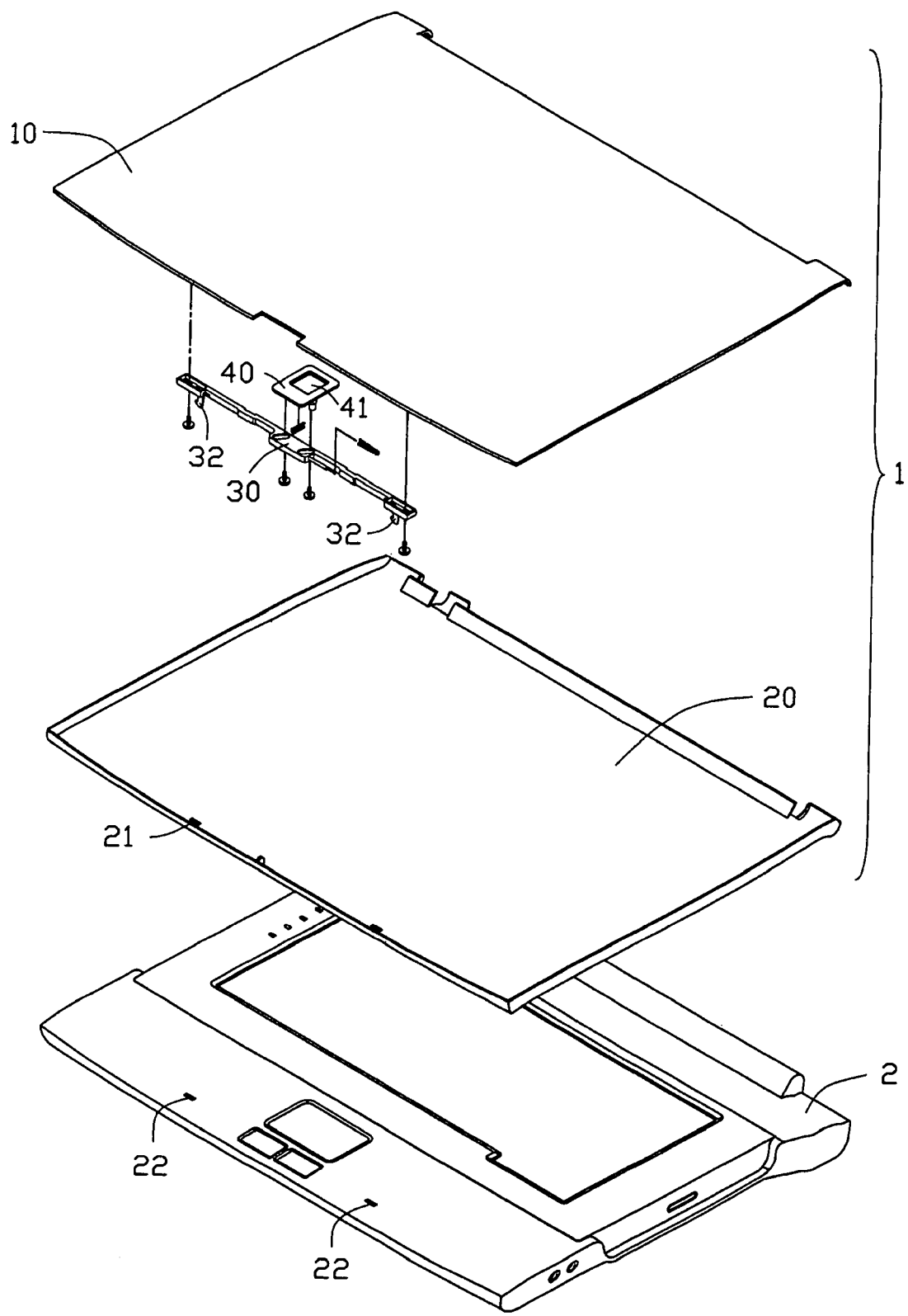
FIG. 1 is an exploded, isometric view of a portable computer in accordance with a first preferred embodiment of the present invention, the portable computer including a base unit, a cover unit and a latch mechanism.
Figure 2:
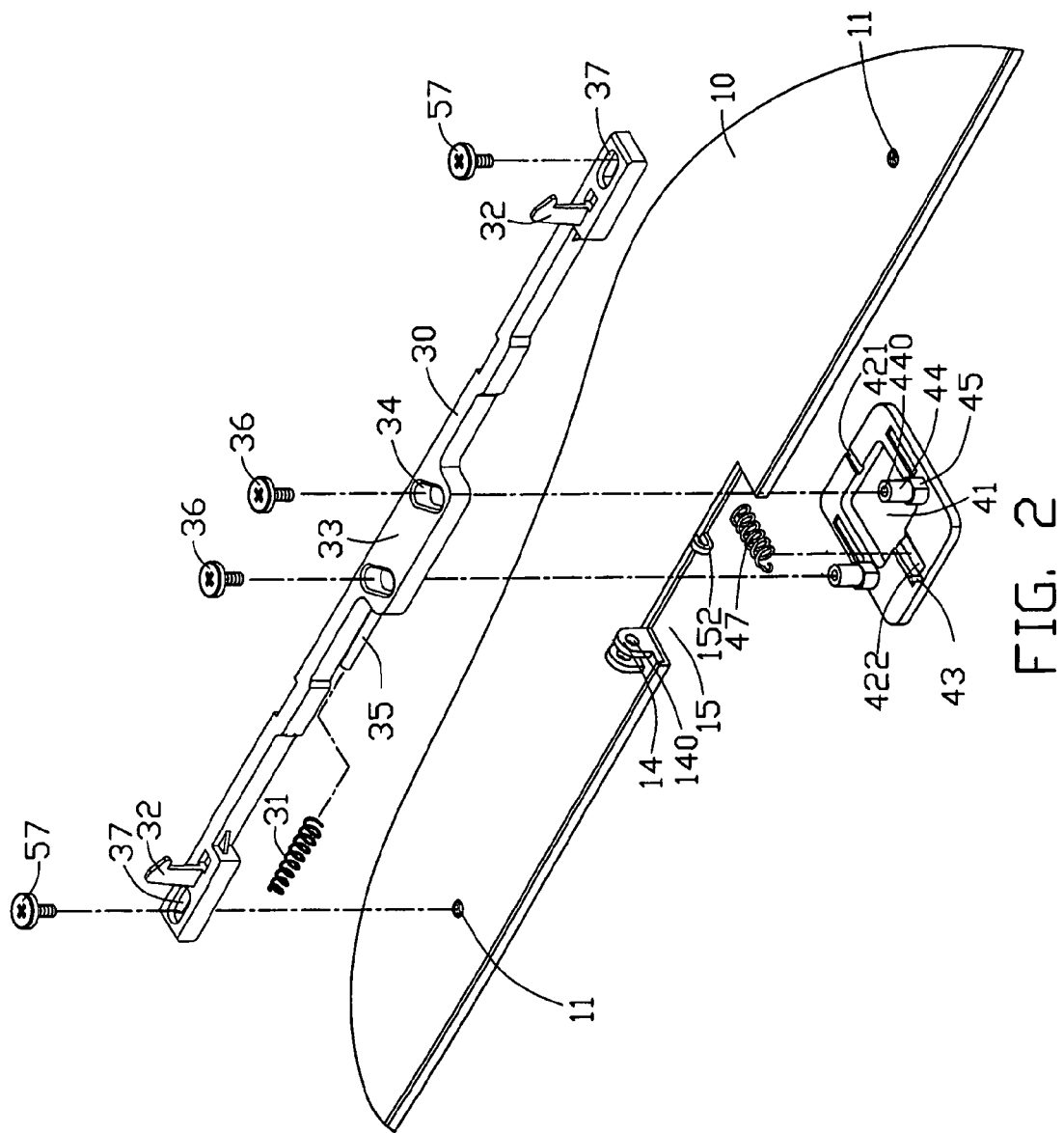
FIG. 2 is an enlarged isometric view of a part of the cover unit and the latch mechanism of FIG. 1, but viewed from another aspect.

Referring to FIGS. 1 and 2, a portable electronic device like a portable computer in accordance with a first preferred embodiment of the present invention includes a cover unit 1 and a base unit 2 pivotally connected to a rear portion of the cover unit 1. The cover unit 1 includes a latch mechanism disposed at a front portion thereof for locking the cover unit 1 to the base unit 2 when the portable computer is not in use.

The latch mechanism includes a latch member 30, and a driving button 40 generally disposed at an external surface of the cover unit 1 for facilitating manipulating the latch mechanism.

The cover unit 1 includes a panel 10 and a housing 20. A pair of spaced threaded holes 11 is defined in an internal side of the panel 10 adjacent a front edge of the panel 10. A cutout 15 is defined in the panel 10 by cutting rearward from the front edge thereof, between the threaded holes 11. A pair of tabs 14 each with a through hole 140 defined therein is formed at a left side portion of the cutout 15. A hook 152 extends from an inner edge portion of the cutout 15.

Referring particularly to FIG. 1, a pair of first apertures 21 is defined in the housing 20.

Referring to FIG 2, the latch member 30 includes a longitudinal body defining a pair of slots 37 in two opposite ends thereof, each slot 37 corresponding to a respective threaded hole 11 of the panel 10. A pair of rightward hooks 32 is arranged adjacent the slots 37, and corresponding to respective apertures 21 of the housing 20. A protrusion 33 extrudes from a middle portion of the latch member 30. A pair of grooves 34 is leftwardly and slantedly defined in the protrusion 33. A shaft 35 extrudes from a side portion of the protrusion 33, corresponding to the through holes 140 of the tabs 14 of the panel 10 for attaching a first coil spring 31.

A handgrip portion 41 is defined in the driving button 40. A pair of posts 44 extends perpendicularly from the inner portion of the driving button 40, beside the handgrip portion 41. A threaded hole 440 is defined in each of the posts 44. A supporting shoulder 45 is formed in a bottom portion of each of the posts 44. A height of the shoulder 45 is approximately equal to that of the panel 10, and a width of the shoulder 45 is slightly greater than that of each groove 34 of the latch member 30. A first channel 421, and a second channel 422 are defined in the inner portion of the driving button 40, at two ends of the recess 411 respectively. The first channel 421 aligns with the second channel 422. A pin 43 extends from the driving button 40 beside an end of the channel 422, together with the hook 152 of the panel 10 for attaching a second coil spring 47 therebetween.

Referring back to FIG. 1, the base 2 defines a pair of apertures 22 at a front portion thereof corresponding to the hooks 32 of the latch member 30 respectively as complementary parts of the latch member 30.

In assembly, the latch member 30 is slidably attached to the panel 10, with two fasteners 57 extending through the slots 37 and engaging in the threaded holes 11 respectively. The first coil spring 31 is fixed around the shaft 35 of the bracket 30 and the shaft 351 is extended through the through holes 140 of the tabs 14. The driving button 40 is attached to the panel 10 and the latch member 30. The driving button 40 engages an external surface of the panel 10 and overlaps the cutout 15 of the panel 10. The posts 44 of the driving button 40 are respectively extended through the grooves 34 of the latch member 30 and engaged with two fasteners 36. Two free ends of the second coil spring 47 respectively engage with the hook 152 and the pin 43, with the coil spring slidably along the second channel 422 and the hook 152 slidably along the first channel 421.

The housing 20 is then assembled with the panel 10 to form the cover unit 1, and the hooks 32 of the latch member 30 protrude outward from the apertures 21 of the housing 20 respectively.

Figure 4:
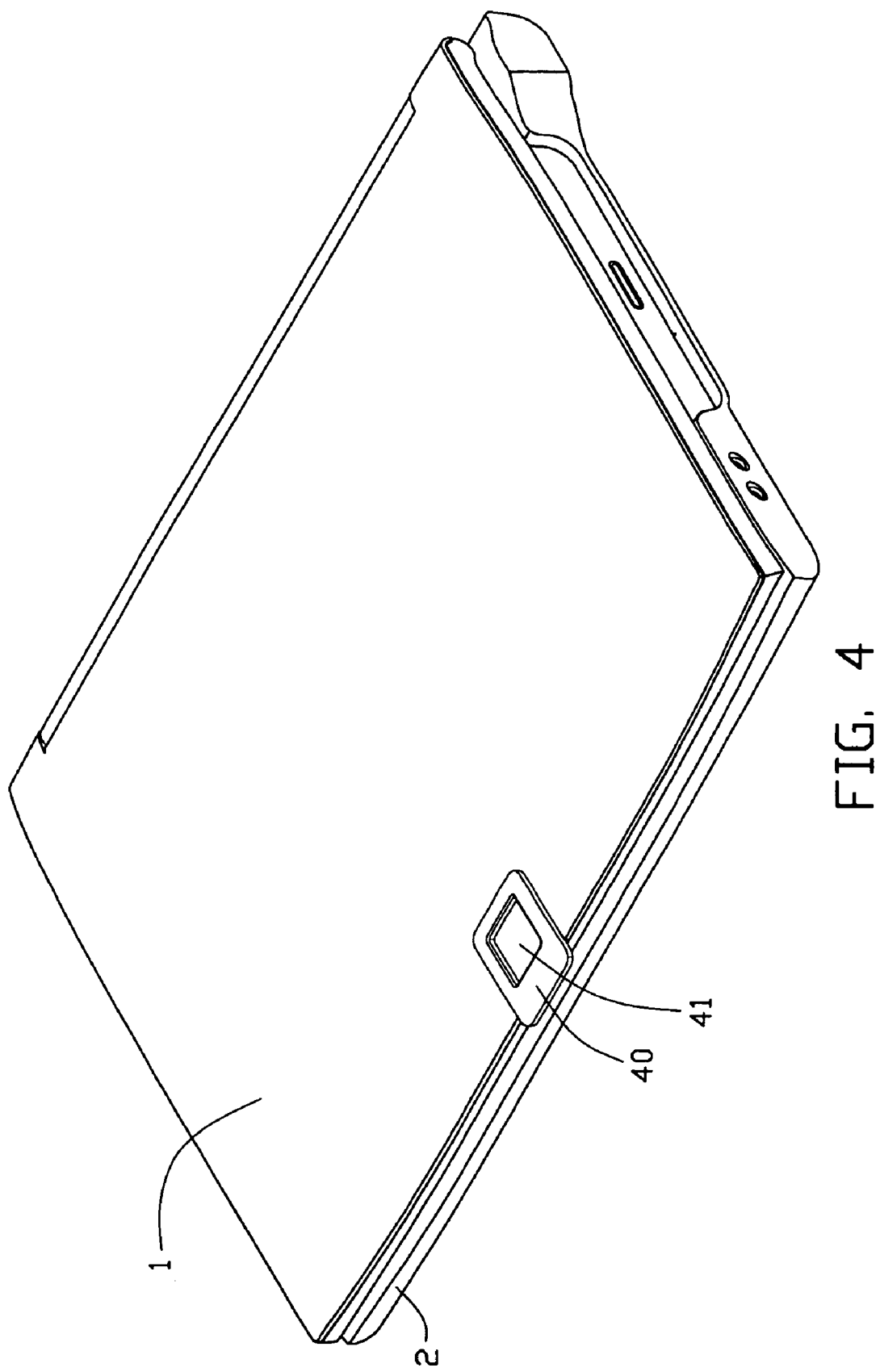
FIG. 4 is an assembled view of FIG. 1.

As shown in FIG. 4, the cover unit 1 is pivotally attached to the base unit 2, and the cover unit 1 is folded to cover the base 2, with hooks 32 engaging in the apertures 22 and latching the base unit 2.

Figure 3:
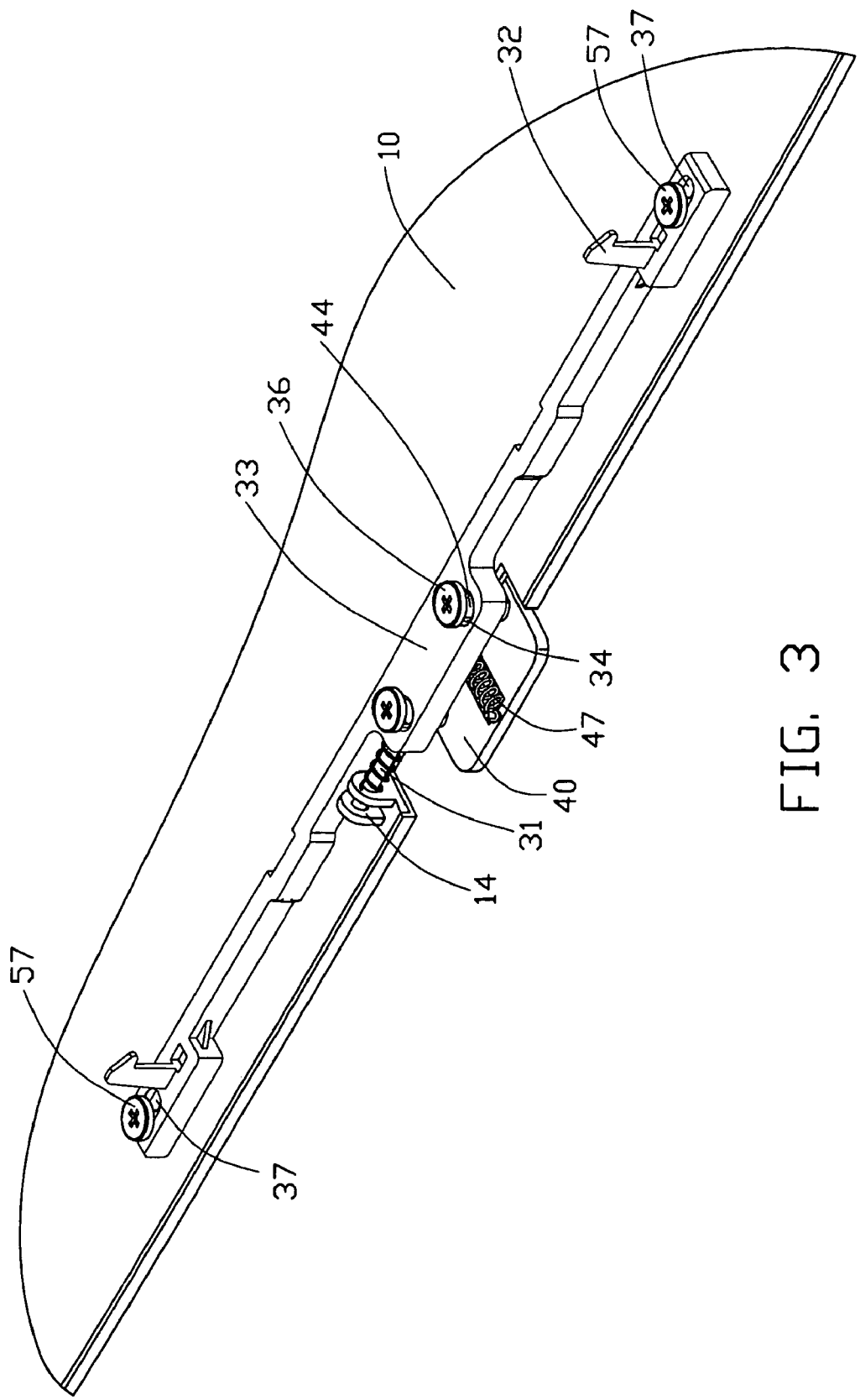
FIG. 3 is an assembled views of FIG. 2, showing the latch mechanism in a locking state.

To open the cover unit 1 from the base unit 2, the handgrip portion 41 is drawn in a direction away from the panel 10. Accordingly, the driving button 40 is moved outwardly. As shown in FIG. 3, the second coil spring 47 is stretched. The posts 44 of the driving button 40 slide from inner ends of the grooves 34 to outer ends of the grooves 34. The latch member 30 is moved to depress the first coil spring 31 in a second direction perpendicular to the first direction, with the fasteners 57 sliding in the slots 37. The hooks 32 are thereby disengaged from the apertures 22 of the base unit 2 respectively. The cover unit 1 is ready to be opened. When the driving button 40 is released, the first coil spring 31 is restored to move the latch member 30 back to its original position, and the second coil spring 47 is restored to move driving button 40 back to its original position respectively.

Figure 5:
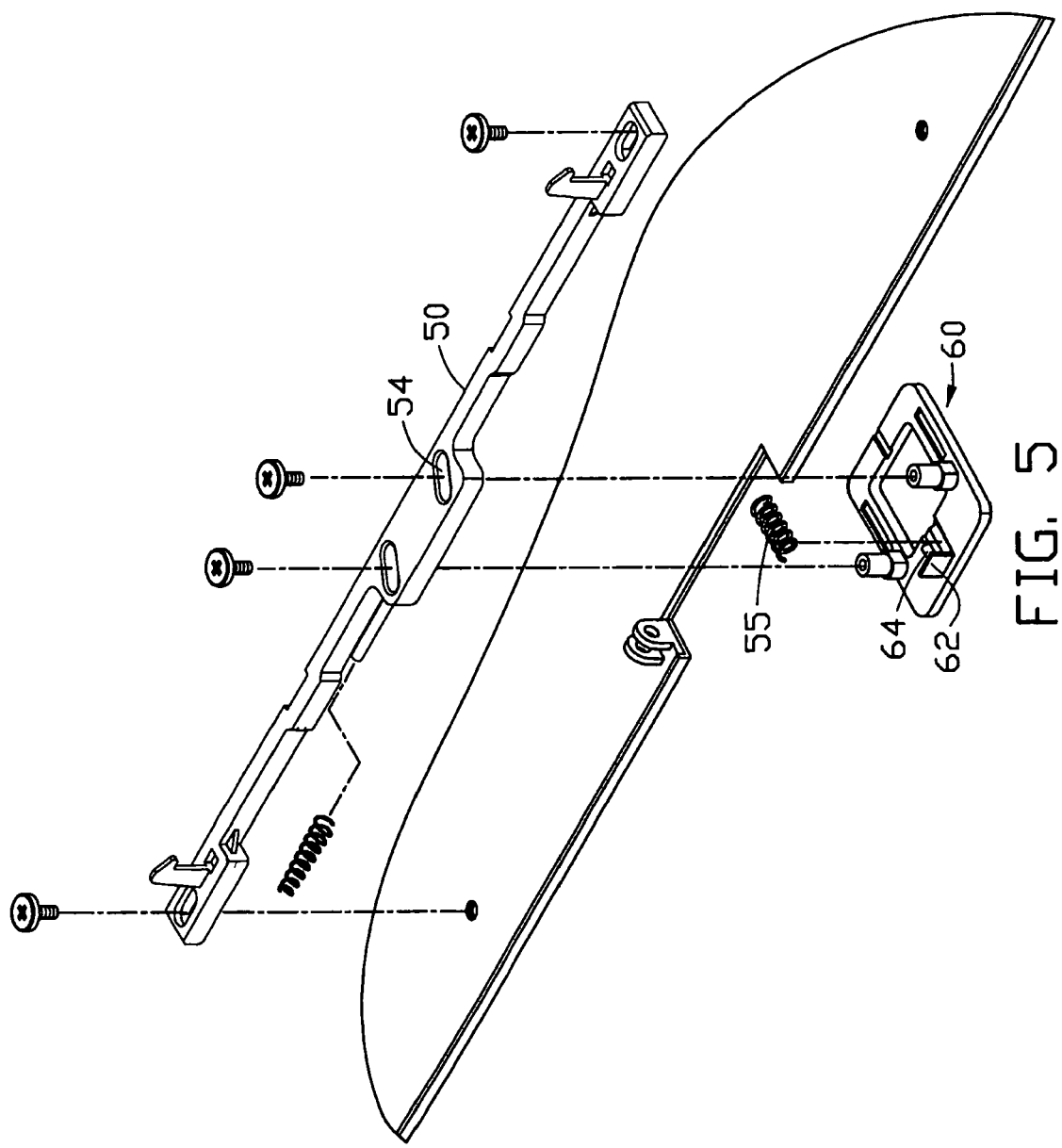
FIG. 5 is an exploded, isometric view of a part of a cover unit and a latch mechanism of a portable computer in according with a second preferred embodiment of the present invention.

Referring back to FIG. 5, a second preferred embodiment of the latch mechanism includes a latch member 50, and a driving button 60. A pair of grooves 54 is righttwardly and slantedly defined in the latch member 50. The driving button 60 includes a block 62 with a shaft 64 perpendicularly extending from the block 62. A coil spring 55 is fixed around the shaft 64 and is depressed by the block 62.

It is believed that the present embodiments and their advantages will be understood from the foregoing description, and it will be apparent that various changes may be made thereto without departing from the spirit and scope of the invention or sacrificing all of its material advantages, the examples hereinbefore described merely being preferred or exemplary embodiment.

What is claimed is:

1. A portable computer, comprising:
a cover unit comprising a panel, a latch member attached to the panel and sliding in a first direction, and a driving button attached to the panel and sliding in a second direction perpendicular to the first direction to move the latch member; and
a base unit connected with the cover unit, the cover unit latched to the base unit via the latch member to cover the base unit and unlatched from the base unit via moving the latch member by manipulation of the driving button;
wherein the driving button comprises at least one post extending therefrom, the latch member comprises at least one groove slantedly defined therein to slidably engage said at least one post, a threaded hole is defined in said at least one post, a fastener engages in the threaded hole.

2. The portable computer as claimed in claim 1, wherein a resilient member is stretchedly associated with the panel to restore the driving button.

3. The portable computer as claimed in claim 2, wherein a cutout is defined in the panel, a hook extends from a side of the cutout, a pin extends from the driving button, the resilient member is a coil spring with its two free ends of the first resilient member are fixed on the hook and the pin.

4. The portable computer as claimed in claim 3, wherein a first channel and a second channel are defined in the driving button, for respectively and slidably receiving the hook and the coil spring.

5. The portable computer as claimed in claim 1, wherein a resilient member is compressedly associated with the panel to restore the driving button.

6. The portable computer as claimed in claim 5, wherein the driving button includes a block with a shaft perpendicularly extending from the block, the resilient member is fixed around the shaft and is depressed between the block and the panel.

7. The portable computer as claimed in claim 1, wherein the latch member comprises a pair of hooks protruding outward from the panel, and a pair of apertures is defined in the base unit for receiving the hooks respectively.

8. The portable computer as claimed in claim 1, wherein a pair of slots is defined in two ends of the latch member, and a pair of fasteners is extended through the slots to slidably attach the latch member to the panel.

9. The portable computer as claimed in claim 1, wherein a spring is provided to restore the latch member along the fastener after the cover unit is unlatched from the base unit.

10. The portable computer as claimed in claim 9, wherein a cutout is defined in the panel, a tab defined a through hole extends at a side of the cutout, a shaft extends from the latch member and extends through the through hole, the spring is fixed around the shaft.

11. A combination comprising:
a cover unit;
a latch mechanism comprising a latch member movably received in the cover unit, and a driving button movably attached to the cover unit, the latch member comprising a hook, at least one slanted groove, and at least one slot, the driving button comprising at least one post extending therefrom sliding in said groove, a fastener fixed on the cover unit and slidably extended through said slot; and
a base unit defining at least one aperture corresponding to said hook, said hook entering said aperture and latching the base unit to attach the cover unit to the base unit, and the driving button being slid to drive the latch member thereby unlatching said hook from the base unit.

12. The portable computer as claimed in claim 11, wherein the latch member comprises a protrusion extending therefrom, the cover unit comprises a panel defining a cutout in an edge portion thereof, corresponding to the protrusion and the driving button.

13. The combination as claimed in claim 12, wherein a tab defined a through hole extends at a side of the cutout, a shaft fixing a coil spring therearound extends from the protrusion to extend through the through hole.

14. The combination as claimed in claim 12, wherein a resilient member is stretchedly attached between the panel and the driving button.

15. The combination as claimed in claim 12, wherein a resilient member is compressedly attached between the driving button and the panel.

16. The combination as claimed in claim 11, wherein a supporting shoulder is formed around said post.

17. An electronic device comprising:

a base unit containing a part of said electronic device;

a cover unit containing another part of said electronic device and movable relative to said base unit between a first position thereof to abut against a side of said base unit and a second position thereof to expose said side of said base unit by moving away therefrom;

a latch member movably installable in one of said base unit and said cover unit, and movable along a predefined direction to engage with the other of said base unit and said cover unit in order for securing said cover unit to said base unit in said first position thereof, and along a reverse direction of said predefined direction to disengage from said other of said base unit and said cover unit in order for releasing said cover unit, said latch member comprising at least one groove formed therein extending different from said predefined and reverse directions; and a driving button installable next to said latch member to be engagable with said at least one groove and sliding along another direction different from said predefined and reverse directions due to said at least one groove so as to urge movement of said latch member along a selective one of said predefined and reverse directions.

18. The electronic device as claimed in claim 17, wherein said driving button comprises a shaft perpendicularly extending therefrom, a resilient member is disposed around said shaft between said driving button and said one of said base unit and said cover unit, and deformable to restore said driving button.

19. The electronic device as claimed in claim 17, further comprising a resilient member disposed between said latch member and said one of said base unit and said cover unit, and deformable to restore said latch member.

20. The electronic device as claimed in claim 17, wherein a pair of slots is defined in two ends of said latch member, and a pair of fasteners is extended through said pair of slots to slidably attach said latch member to said one of said base unit and said cover unit.

* * * * *